US012731834B2

(12) United States Patent
Koda

(10) Patent No.: US 12,731,834 B2
(45) Date of Patent: Sep. 8, 2026

(54) PACKAGING MATERIAL FOR POWER STORAGE DEVICE, PACKAGING CASE FOR POWER STORAGE DEVICE, AND POWER STORAGE DEVICE

(71) Applicant: Resonac Packaging Corporation, Hikone (JP)

(72) Inventor: Naoya Koda, Tokyo (JP)

(73) Assignee: Resonac Packaging Corporation, Hikone (JP)

(*) Notice: Subject to any disclaimer, the term of this patent is extended or adjusted under 35 U.S.C. 154(b) by 604 days.

(21) Appl. No.: 18/207,104

(22) Filed: Jun. 7, 2023

(65) Prior Publication Data

US 2023/0411741 A1 Dec. 21, 2023

(30) Foreign Application Priority Data

Jun. 8, 2022 (JP) ................................ 2022-093211
May 8, 2023 (JP) ................................ 2023-076574

(51) Int. Cl.

*H01M 50/129* (2021.01)
*H01M 50/105* (2021.01)
*H01M 50/119* (2021.01)
*H01M 50/121* (2021.01)
*H01M 50/124* (2021.01)
*H01M 50/134* (2021.01)

(52) U.S. Cl.

CPC ....... *H01M 50/129* (2021.01); *H01M 50/105* (2021.01); *H01M 50/119* (2021.01); *H01M 50/121* (2021.01); *H01M 50/1243* (2021.01); *H01M 50/134* (2021.01)

(58) Field of Classification Search

None

See application file for complete search history.

(56) References Cited

U.S. PATENT DOCUMENTS 9,122,183 B2 * 9/2015 Toshine ............. G03G 5/14769
9,152,109 B2 * 10/2015 Sugawara .......... G03G 15/2057
2023/0223620 A1 * 7/2023 Kageyama ............. H01G 11/84 429/163

FOREIGN PATENT DOCUMENTS

JP 2003-288865 10/2003
JP 2006-318685 11/2006
WO WO-2021201294 A1 * 10/2021 ............. B32B 27/00

* cited by examiner

*Primary Examiner* — Wyatt P Mcconnell
(74) *Attorney, Agent, or Firm* — MORI & WARD, LLP

(57) ABSTRACT

A packaging material for a power storage device includes a laminated material. The laminated material is composed of a metal foil layer, a substrate layer provided on an outer surface side of the metal foil layer, and a heat-fusible resin layer provided on an inner surface side of the metal foil layer. The heat-fusible resin layer is arranged on an inner surface side of the packaging material. The heat-fusible resin layer is formed of a polyolefin-based film. Martens hardness HMs of the heat-fusible resin layer measured with a Berkovich indenter is in a range of 15 $N/mm^2$ to 25 $N/mm^2$.

8 Claims, 4 Drawing Sheets

FIG. 5

PACKAGING MATERIAL FOR POWER STORAGE DEVICE, PACKAGING CASE FOR POWER STORAGE DEVICE, AND POWER STORAGE DEVICE

BACKGROUND OF THE INVENTION

Technical Field

The present invention relates to a packaging material for a power storage device, such as, e.g., a battery and a capacitor. It also relates to a packaging case for a power storage device, and a power storage device.

Description of the Related Art

In a power storage device, such as, e.g., a battery (e.g., a lithium-ion secondary battery, a solid-state battery), and a capacitor (e.g., an electric double layer capacitor, a lithium-ion capacitor) used in a portable electronic device (e.g., a smartphone, a tablet computer), an electric vehicle (including a hybrid vehicle), a generator storage battery, a night power storage battery, etc., the power storage device main body is packaged with a packaging material.

This packaging material is provided with a metal foil layer, a substrate layer provided on the outer surface side of the metal foil layer, and a heat-fusible resin layer provided on the inner surface side of the metal foil layer in a laminated state. This packaging material is composed of a laminated material in which the above-described layers are integrally bonded in a laminated state. The heat-fusible resin layer is arranged on the inner surface of the packaging material, and therefore, the inner surface of the packaging material serves the surface of the heat-fusible resin layer.

In the case of packaging, for example, a battery main body as a power storage device main body with this packaging material, in order to form a space in the packaging material to accommodate the battery main body, molding, such as, e.g., drawing (e.g., deep drawing, stretch molding) using tooling (a die, a punch, etc.) is performed on the packaging material to form the packaging material into a predetermined shape, such as, e.g., a container shape.

A packaging material need to have good sliding properties against molding dies to obtain stable molding workability. Therefore, in order to improve the slipperiness of a packaging material, Japanese Patent Application Publication No. 2003-288865 (Patent Document 1) discloses adding 1,000 ppm to 5,000 ppm of a lubricant to a sealant film made of a predetermined material constituting the packaging material. Further, Japanese Patent Application Publication No. 2006-318685 (Patent Document 2) discloses adjusting the center line average roughness Ra of the surface of the heat-adhesive resin layer (heat-fusible resin layer) of the packaging material to 60 nm to 1,000 nm.

Patent Document

Patent Document 1: Japanese Patent Application Publication No. 2003-288865

Patent Document 2: Japanese Patent Application Publication No. 2006-318685

Problem to be Solved by the Invention

As a power storage device, for example, an automotive storage battery is designed to increase the battery capacity and the volume energy density in order to extend the cruising range. For this reason, a packaging material is required to be capable of being formed and processed into a sharp and deep shape. In recent years, this requirement has been increasing, and there occurs a case in which it is difficult to mold the packaging material into such a shape simply by providing good slipperiness of the packaging material. Therefore, there is an increasing need to find material properties of a packaging material that contribute to good molding workability, in addition to the slipperiness of the packaging material.

SUMMARY OF THE INVENTION

The present invention has been made in view of the technical background described above, and the object of the present invention is to provide a packaging material for a power storage device having high molding workability, a packaging case for a power storage device using the packaging material, and a power storage device packaged with the packaging material.

Other objects and advantages of the present invention will become apparent from the following preferred embodiments.

Means for Solving the Problem

The present invention provides the following means.

(1) A packaging material for a power storage device comprising:

a laminated material, wherein the laminated material is provided with a metal foil layer, a substrate layer provided on an outer surface side of the metal foil layer, and a heat-fusible resin layer provided on an inner surface side of the metal foil layer in a laminated state, wherein the heat-fusible resin layer is arranged on an inner surface side of the laminated material, wherein the heat-fusible resin layer is formed of a polyolefin-based film, and wherein Martens hardness HMs of the heat-fusible resin layer measured with a Berkovich indenter is in a range of 15 N/mm$^2$ to 25 N/mm$^2$.

(2) The packaging material for a power storage device as recited in the above-described Item 1, wherein a coefficient of dynamic friction of an inner surface of the packaging material is in a range of 0.02 to 0.3.

(3) The packaging material for a power storage device as recited in the above-described Item 1 or 2, wherein the polyolefin-based film is formed of at least one layer of film, and wherein in the at least one layer of film, a film forming an inner surface of the packaging material contains 500 mass ppm to 3,000 mass ppm of a fatty acid amide-based lubricant.

(4) A packaging case for a power storage device, the packaging case being provided with a deep-drawn molded article or a stretch-molded article of the packaging material as recited in any one of the above-described Items 1 to 3 as a packaging case constituent member.

(5) A power storage device in which a power storage device main body is accommodated in a packaging case equipped with a deep-drawn molded article or a stretch-molded article of the packaging material as recited in any one of the above-described Items 1 to 3 as a packaging case constituent member.

Effects of the Invention

The present invention was made based on the inventor's finding that the packaging material could be molded well in a case where the Martens hardness HMs is within a predetermined range as a physical property indicating the compression resistance of the heat-fusible resin layer as a result of focusing on the compression resistance (the degree of deformation and the degree of repulsion) of the heat-fusible resin layer of the packaging material among various material properties and investigating the relation between the compression resistance and the molding workability of the packaging material.

In other words, in the above-described Item 1, since the Martens hardness HMs of the heat-fusible resin layer of the packaging material measured using a Berkovich indenter is in a range of 15 $N/mm^2$ to 25 $N/mm^2$, the following effects can be achieved.

Since the HMs is 15 $N/mm^2$ or more, in the case of molding the packaging material by drawing processing, etc., using tooling (a die, a punch, etc.), the step formed between the portion (this portion is also referred to as the "portion-to-be-pressed" of the packaging material) of the packaging material pressed by a blank holder plate when the outer peripheral portion of the packaging material placed on the die is pressed by the blank holder plate from the upper side and the upper surface of the outer peripheral portion of the packaging material protruding from the blank holder plate becomes smaller. This allows the portion-to-be-pressed of the packaging material to be smoothly pulled into the die when the packaging material is pressed and deformed in the die by the punch, thereby enhancing the molding workability of the packaging material.

Since the HMs is 25 $N/mm^2$ or less, the heat-fusible resin layer in the packaging material has an excellent followability with respect to the deformation of the metal foil layer. Therefore, at the time of molding the packaging material, the occurrence of delamination (interlayer peeling) between the metal foil layer and the heat-fusible resin layer or a constriction (local reduction in thickness) of the metal foil layer is suppressed. Thus, the packaging material has high molding workability.

In the above-described Item 2, the coefficient of dynamic friction of the inner surface of the packaging material is in a range of 0.02 to 0.3, thereby achieving the following effects.

When the coefficient of dynamic friction on the inner surface of the packaging material is 0.02 or more, it is possible to assuredly prevent winding slippage of the packaging material when winding the packaging material into a coil shape and is also possible to assuredly suppress accidental meandering of the packaging material on the conveyor along the production line of the packaging case.

Since the coefficient of dynamic friction of the inner surface of the packaging material is 0.3 or less, the inner surface of the packaging material is high in slipperiness, thus improving the molding workability of the packaging material.

In the above-described Item 3, since the polyolefin-based film is formed of at least one layer of film, and in the above-described at least one layer of film, the film forming the inner surface of the packaging material contains 500 mass ppm to 3,000 mass ppm of a fatty acid amide-based lubricant, the following effects can be obtained.

Since the above-described film contains 500 mass ppm or more of a fatty acid amide-based lubricant, the slipperiness of the inner surface of the packaging material is assuredly enhanced, which further enhances the molding workability of the packaging material.

Since the above-described film contains 3,000 mass ppm or less of a fatty acid amide-based lubricant, the amount of lubricant bleeding out on the inner surface of the packaging material can be assuredly reduced. Therefore, it is possible to assuredly suppress the contamination of the tooling and/or the production lines by white powdery lubricant deposited on the inner surface of the packaging material.

According to the above-described Item 4, a packaging case with a sharp and deep molded shape can be provided.

According to the above-described Item 5, a power storage device covered with a molded case having a sharp and deep molded shape can be provided.

BRIEF DESCRIPTION OF THE DRAWINGS

FIG. 5 is a schematic perspective view of a power storage device in an exploded state.

EMBODIMENTS FOR CARRYING OUT THE INVENTION

Some embodiments of the present invention will be described below with reference to the attached drawings.

Figure 1:
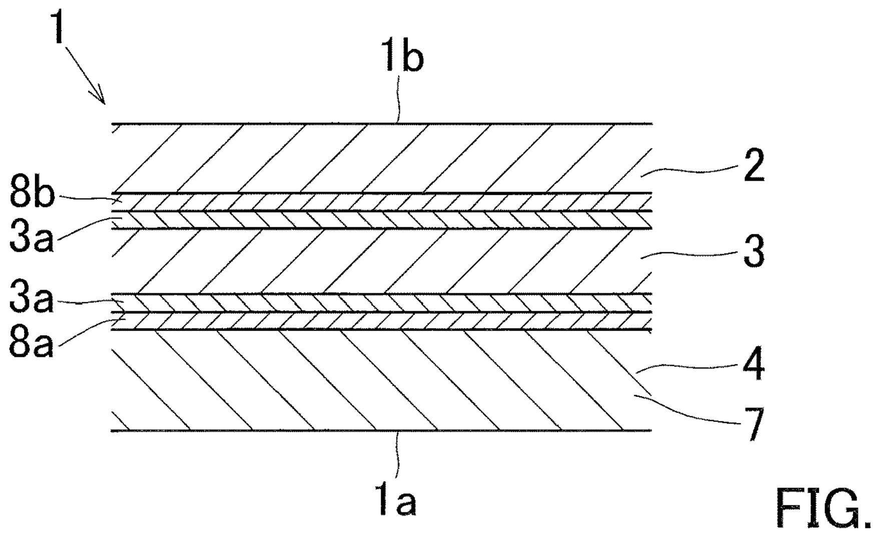
FIG. 1 is a schematic cross-sectional view of a packaging material for a power storage device according to a first embodiment of the present invention.

As shown in FIG. 1, the packaging material 1 for a power storage device according to a first embodiment of the present invention is composed of a laminated material basically composed of a metal foil layer 3, a substrate layer 2 arranged on the outer surface side of the metal foil layer 3, and a heat-fusible resin layer 4 arranged on the inner surface side of the metal foil layer 3. These layers 2 to 4 are integrally bonded in a laminated state. Note that the reference symbol "1*a*" denotes the inner surface of the packaging material 1, and the reference symbol "1*b*" denotes the outer surface of the packaging material 1.

In detail, the substrate layer 2 and the metal foil layer 3 are bonded to each other via an outer surface side adhesive layer 8*b* arranged between these two layers 2 and 3. The metal foil layer 3 and the heat-fusible resin layer 4 are bonded to each other via an inner surface side adhesive layer 8*a* arranged between these two layers 3 and 4.

The heat-fusible resin layer 4 is arranged on the inner surface 1*a* side of the packaging material 1, and therefore, the inner surface 1*a* of the packaging material 1 serves the surface of the heat-fusible resin layer 4.

The packaging material 1 is generally commercialized in the form of a packaging material coil, which is produced by winding a long strip of the packaging material 1 into a coil. The packaging material 1 is then unwound from the packaging material coil and subjected to molding when molding the packaging material 1.

Figure 4:
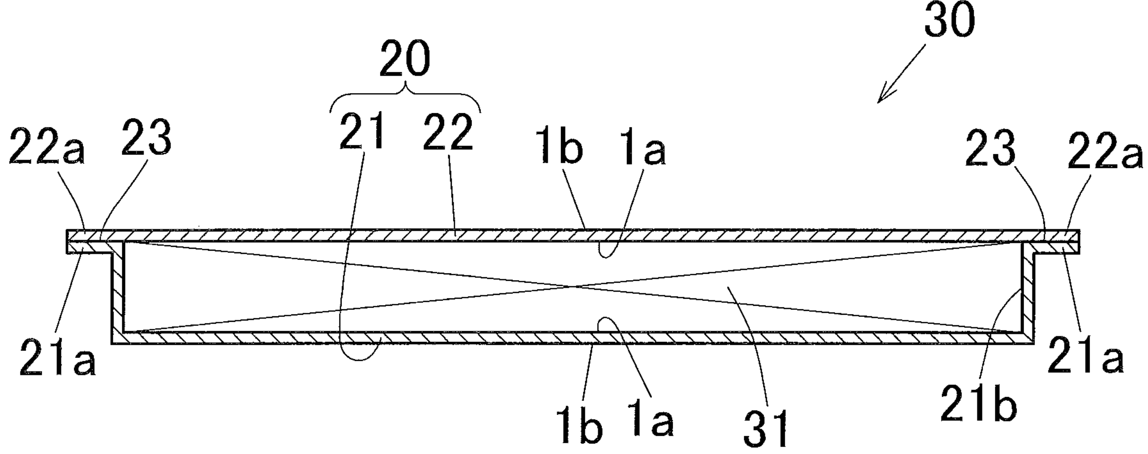
FIG. 4 is a schematic cross-sectional view of a power storage device according to an embodiment of the present invention.
Figure 5:
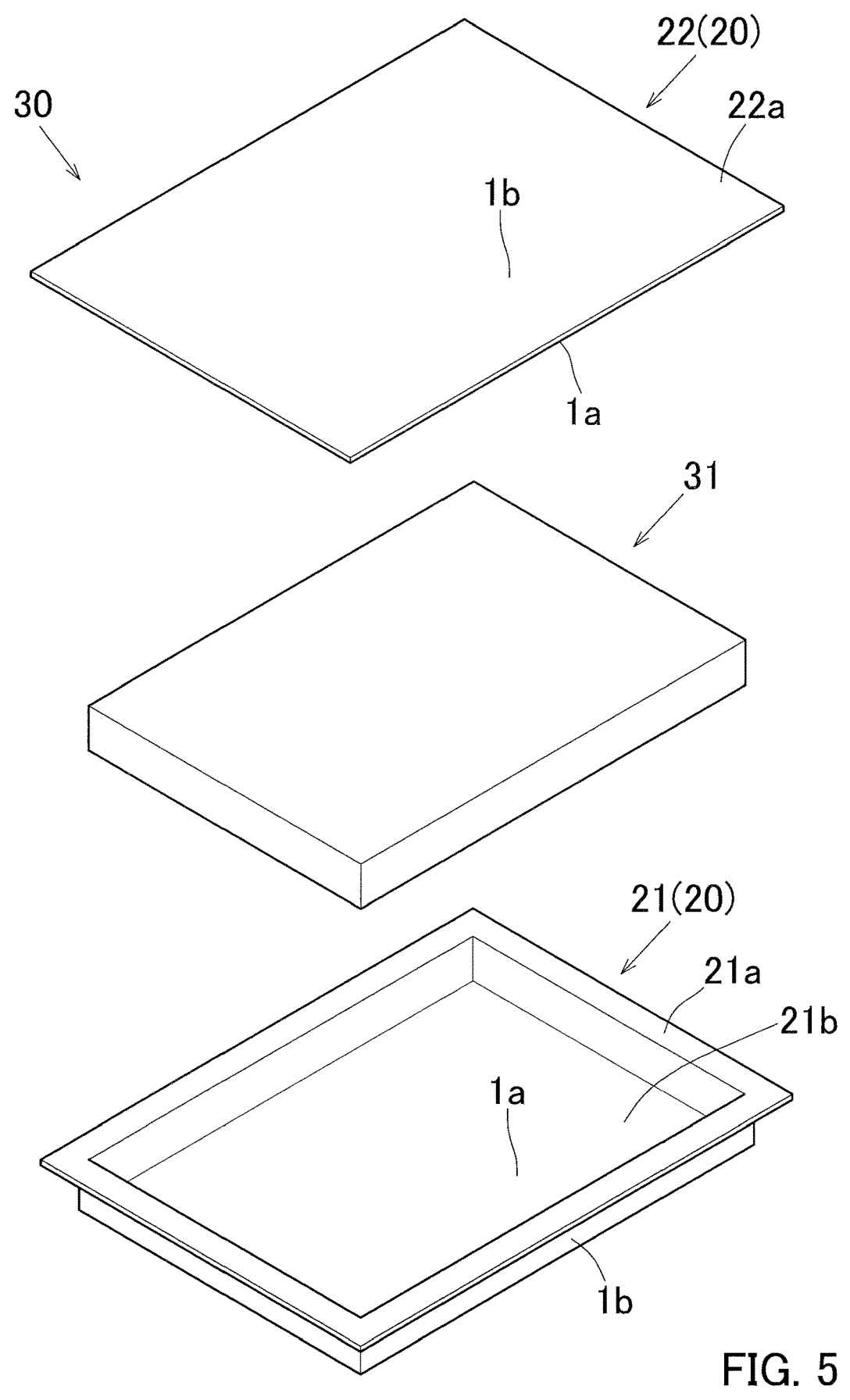

In this first embodiment, the packaging material 1 is used for packaging, for example, a lithium-ion secondary battery 30 as a power storage device as shown in FIGS. 4 and 5.

The lithium-ion secondary battery 30 is provided with a battery main body 31 as a power storage device main body and a packaging case 20 for accommodating the battery main body 31 in an surrounded state. As shown in FIG. 5, the packaging case 20 is provided, as constituent members of the packaging case 20, with a rectangular container-shaped packaging case main body 21 opening upward and a plate-shaped lid 22 for closing the opening of the packaging case main body 21.

The packaging case main body 21 is produced by molding the above-described packaging material 1 into a rectangular container shape by deep-drawing molding or stretch-molding using tooling (a die, a punch, etc.) so that the inner surface 1*a* of the packaging material 1 faces inward. In other words, the packaging case main body 21 is composed of a deep-drawn molded article or a stretch-molded article of the packaging material 1.

A recess 21*b* is provided in the center of the inner surface 1*a* of the packaging case main body 21 to accommodate the battery main body 31, and a flange portion 21*a* protruding outwardly is provided at the outer peripheral portion of the packaging case main body 21 as a portion-to-be-joined.

The lid 22 is used in a flat state without molding the packaging material 1, and the outer peripheral portion 22*a* of the lid 22 is a portion-to-be-joined of the lid 22.

In the battery 30, the battery main body 31 is accommodated in the recess 21*b* of the packaging case main body 21. The lid 22 is arranged on the packaging case main body 21 with its inner surface 1*a* facing the battery main body 31 side (lower side). The heat-fusible resin layer (4, see FIG. 1) of the flange portion (portion-to-be-joined) 21*a* of the packaging case main body 21 and the heat-fusible resin layer (4, see FIG. 1) of the outer peripheral portion (portion-to-be-joined) 22*a* of the lid 22 are thermally fused (bonded) in a hermetically sealed state by heat sealing. As a result, a battery 30 in which the battery main body 31 is surrounded by the packaging case 20 is formed.

The reference symbol "23" in FIG. 4 denotes a heat-sealed portion ("heat-fused portion") between the heat-fusible resin layer 4 of the flange portion 21*a* of the packaging case main body 21 and the heat-fusible resin layer 4 of the outer peripheral portion 22*a* of the lid 22.

In the battery 30, the inner surface 1*a* of the packaging material 1 forming the packaging case main body 21 faces the battery main body 31, and the inner surface 1*a* of the packaging material 1 forming the lid 22 also faces the battery main body 31.

Note that tab leads connected to the battery main body 31 are generally led out from the battery main body 31 through the heat-sealed portion 23 to the outside of the packaging case 20, but the tab leads are not illustrated in FIGS. 4 and 5.

Next, the composition of the packaging material 1 is described in detail below.

In the packaging material 1 of this first embodiment shown in FIG. 1, the substrate layer 2 is made of a heat-resistant resin and is specifically formed of a heat-resistant resin film. As this heat resistant resin film, a biaxially stretched polyamide film, a biaxially stretched polybutylene terephthalate (PBT) film, a biaxially stretched polyethylene terephthalate (PET) film, or a biaxially stretched polyethylene naphthalate (PEN) film is preferably used. Among these, as the polyamide film, it is not particularly limited, but, for example, a 6 nylon film, a 6,6 nylon film, and an MXD nylon film can be suitably used.

Further, as the heat-resistant resin of the substrate layer 2, it is preferable to use a resin having a melting point higher by 10° C. or more, more preferably higher by 20° C. or more, than all the resins constituting the heat-fusible resin layer 4.

The thickness of the substrate layer 2 is not limited and is preferably in the range of 9 μm to 50 μm.

The metal foil layer 3 is composed of a metal foil. As this metal foil, an aluminum (Al) foil, a copper (Cu) foil, a stainless steel (SUS) foil, a titanium (Ti) foil, a nickel (Ni) foil, etc., may be used alone, or a clad material made by bonding two or more metal foils, etc., may also be used. Among them, an aluminum foil is suitably used as the metal foil. In particular, an Al—Fe-series alloy foil containing 0.7 mass % to 1.7 mass % of Fe among aluminum foils has excellent strength and ductility, which can ensure good molding workability.

The thickness of the metal foil layer 3 is not limited and is preferably in the range of 20 μm to 100 μm.

It is preferred that an underlying layer 3*a* be formed on at least one of the inner surface and the outer surface of the metal foil layer 3. In this first embodiment, the underlying layer 3*a* is formed on both the inner and outer surfaces of the metal foil layer 3.

The underlying layer 3*a* can be formed by performing a silane coupling agent coating treatment or a chemical conversion treatment, such as, e.g., a chromate treatment. The formation of the underlying layer 3*a* improves the adhesive strength with the adhesive layers 8*a* and 8*b* provided on the inner and outer surfaces of the metal foil layer 3, which effectively prevents peeling of the adhesive layers 8*a* and 8*b*.

In the case of forming the underlying layer 3*a* by a coating (chemical conversion coating) by chemical conversion processing, as the chemical conversion processing, a chromate treatment, a non-chrome type chemical conversion treatment using a zirconium compound, etc., can be exemplified.

For example, in the case of a chromate treatment, an aqueous solution of any of the following mixtures 1) to 3) is applied to the surface of a degreased metal foil and then dried.

1) A mixture of phosphoric acid, chromic acid, and at least one of a metal salt of fluoride and a non-metal salt of fluoride 2) A mixture of phosphoric acid, one of an acryl-based resin, a chitosan derivative resin, and a phenol-based resin, and at least one of chromic acid and a chromium (III) salt 3) A mixture of phosphoric acid, one of an acryl-based resin, a chitosan derivative resin, and a phenol-based resin, at least one of chromic acid and a chromium (III) salt, and at least one of a metallic salt of fluoride and a nonmetallic salt of fluoride.

The chromium adhesion amount of the chemical conversion coating is preferably set at 0.1 $mg/m^2$ to 50 $mg/m^2$, more preferably 2 $mg/m^2$ to 20 $mg/m^2$, on one surface of the metal foil.

Note that the chemical conversion coating may be formed on only one of the inner surface and the outer surface of the metal foil layer 3 or on both surfaces thereof.

As an adhesive constituting the "outer surface side adhesive layer 8*b*," a two-part curing type adhesive composed of, for example, a first liquid composed of one or more kinds of polyols selected from the group consisting of a polyurethane-based polyol, a polyester-based polyol, a polyether-based polyol, and a polyester urethane-based polyol, and a second liquid (curing agent) composed of an isocyanate.

The thickness of the outer surface side adhesive layer 8*b* is not limited and is preferably in the range of 2 μm to 5 μm.

As an adhesive constituting the inner adhesive layer 8*a*, an adhesive containing one or more types of resins selected from the group consisting of a polyurethane-based resin, an acryl-based resin, an epoxy-based resin, a polyolefin-based resin, an elastomer-based resin, a fluorine-based resin and an acid modified polypropylene resin can be suitably used. Among them, it is particularly preferable to use an adhesive composed of a polyurethane composite resin containing acid-modified polyolefin as a main agent.

The thickness of the inner adhesive layer 8*a* is not limited and is preferably in the range of 2 μm to 5 μm.

The heat-fusible resin layer 4 is composed of a polyolefin-based film. As this polyolefin-based film, a polyethylene-based film, a polypropylene-based (e.g., rPP (ethylene-propylene random copolymer) film, a bPP (ethylene-propylene block copolymer)-based film, a hPP-based (polypropylene homopolymer)) film, etc., are used, and a non-stretched film, such as, e.g., a cast polypropylene (CPP) film and an inflation polypropylene (IPP) film, is also suitably used. Further, as a non-stretched film, a multi-layered film, such as, e.g., a triple-layer co-extruded polypropylene film in which an ethylene propylene block copolymer is laminated on both surfaces of an ethylene propylene random copolymer, can also be used.

The outer surface of the polyolefin-based film (i.e., the surface of the polyolefin film to which the metal foil layer 3 is attached) is preferably subjected to a corona treatment.

The thickness of the heat-fusible resin layer (polyolefin-based film) 4 is not limited but preferably in the range of 20 μm to 120 μm, and more particularly preferably in the range of 30 μm to 80 μm.

Figure 2:
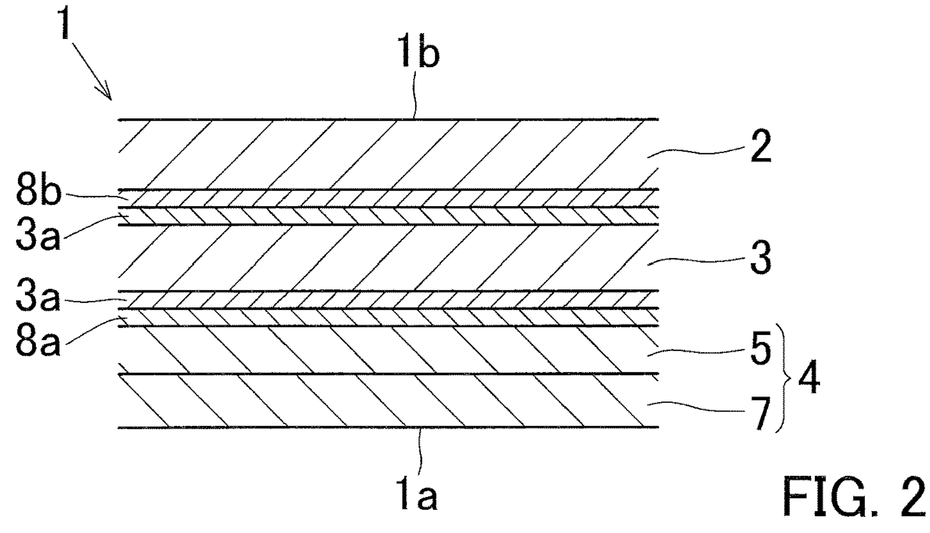
FIG. 2 is a schematic cross-sectional view of a packaging material for a power storage device according to a second embodiment of the present invention.
Figure 3:
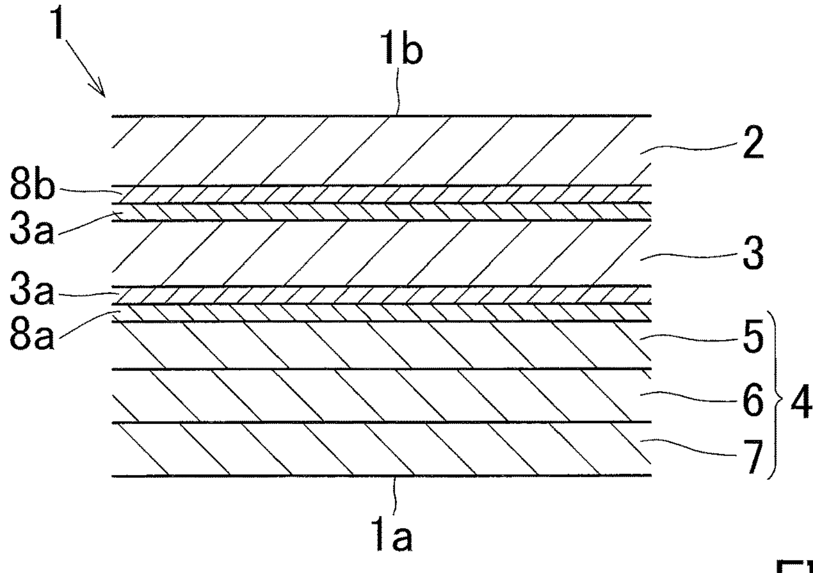
FIG. 3 is a schematic cross-sectional view of a packaging material for a power storage device according to a third embodiment of the present invention.

The heat-fusible resin layer 4 includes a seal layer 7 serving the inner surface 1*a* of the packaging material 1. In this first embodiment, the heat-fusible resin layer 4 is composed of only the seal layer 7. However, in the present invention, the heat-fusible resin layer 4 is not limited by being composed of only the seal layer 7, but may be composed of other multiple layers including the seal layer 7, for example, as in the second and third embodiments shown in FIGS. 2 and 3.

In other words, in the second embodiment (FIG. 2), the heat-fusible resin layer 4 is composed of two layers, i.e., the seal layer 7 and the laminate layer 5 arranged on the metal foil layer 3 side. In the third embodiment (FIG. 3), the heat-fusible resin layer 4 is composed of three layers, i.e., a seal layer 7, a laminate layer 5, and an intermediate layer 6 arranged between these two layers 5 and 7. Therefore, even if the heat-fusible resin layer 4 is composed of only the seal layer (single layer) 7 or multiple layers, the seal layer 7 is arranged as the innermost layer of the heat-fusible resin layer 4 of the packaging material 1.

Hereinafter, the above-described polyolefin-based film constituting the heat-fusible resin layer 4 is also referred to as a "heat-fusible resin film."

In the case where the heat-fusible resin layer 4 is composed of a single layer as in the first embodiment, the heat-fusible resin film is formed of a single layer film. In the case where the heat-fusible resin layer 4 is composed of two layers as in the second embodiment, the heat-fusible resin film is formed of a two-layer film. In the case where the heat-fusible resin layer 4 is composed of three layers as in the third embodiment, the heat-fusible resin film is formed of a three-layer film. Such a multilayer film can be formed by co-extrusion.

In a case where the heat-fusible resin film is formed of a single layer film, the entire heat-fusible resin layer 4 forms the seal layer 7. In a case where the heat-fusible resin film is formed of a two-layer film, the film arranged on the inner surface 1*a* side of the packaging material 1 of the two-layer film forms the seal layer 7 of the heat-fusible resin layer 4, and the film arranged on the metal foil layer 3 side forms the laminate layer 5 of the heat-fusible resin layer 4. In a case where the heat-fusible resin film is formed of three-layer film, the film arranged on the inner surface 1*a* side of the packaging material 1 forms the seal layer 7 of the heat-fusible resin layer 4, the film arranged on the metal foil layer 3 side forms the laminate layer 5 of the heat-fusible resin layer 4, and the film arranged between these two films forms the intermediate layer 6 of the heat-fusible resin layer 4.

Further, in a case where the heat-fusible resin film is formed of a three-layer film, the thickness ratio of the laminate layer 5, the intermediate layer 6, and the seal layer 7 is not limited but is preferably 1-1.5:7-8:1-1.5.

The melting point of the heat-fusible resin film is not limited and is preferably in the range of 100° C. to 200° C.

Further, in order to enhance the heat sealing property, delamination resistance property, and electrical insulation property of the heat-fusible resin layer 4, the seal layer 7, and the laminate layer 5 are preferably made of an ethylene-propylene random copolymer (rPP), and the intermediate layer 6 is preferably made of an ethylene-propylene block copolymer (bPP) or a polypropylene homopolymer (hPP).

In the heat-fusible resin layer 4, at least the seal layer 7 preferably contains at least one of an anti-blocking material (AB material) and a roughening material.

The AB material is composed of fine particles having an average particle diameter in the range of 0.05 μm to 5 μm or less. Specifically, fine particles of silica, alumina, calcium carbonate, barium carbonate, titanium dioxide, aluminum silicate, talc, kaolin, acrylic resin beads, polyethylene resin beads, and the like, are used as the AB material.

In a case where the heat-fusible resin film is formed of a multilayer film, the AB material is preferably contained particularly in the seal layer 7.

The mass addition rate (mass content) of the AB material in the layer containing the AB material (such as the seal layer 7) is not limited but is preferably in the range of 500 mass ppm to 3,500 mass ppm.

The roughening material is composed of particles having an average particle diameter in the range of more than 5 μm and less than 20 μm. Specifically, particles of silica, alumina, calcium carbonate, barium carbonate, titanium dioxide, aluminum silicate, talc, kaolin, acrylic resin beads, polyethylene resin beads, and the like, are used as the roughening material.

In a case where the heat-fusible resin film is formed of a multilayer film, the roughening material is contained preferably in the seal layer 7.

The mass addition rate (mass content) of the roughening material in the layer (such as the seal layer 7) containing the roughening material is not limited but preferably in the range of 500 mass ppm to 5,000 mass ppm.

Furthermore, the thickness of the layer (such as the seal layer 7) containing the roughening material is preferably in the range of 5 μm to 20 μm. When the thickness of this layer is 5 μm or more, the roughening material can be assuredly prevented from falling off from this layer. When the thickness of this layer is 20 μm or less, the roughening effect due to the inclusion of the roughening material can be assuredly achieved.

In the heat-fusible resin layer 4, it is preferable that a lubricant be added at least to the seal layer 7. By adding the lubricant, the slipperiness of the inner surface 1*a* of the packaging material 1 can be assuredly adjusted to a suitable range.

As the lubricant, it is possible to use, for example, saturated fatty acid amides (e.g., lauramide, palmitamide, stearamide, behenamide, hydroxystearamide), unsaturated fatty acid amides (e.g., oleamide, erucamide), substituted amides (e.g., N-oleoyl palmitamide, N-stearyl stearamide, N-stearyl oleamide, N-oleoyl stearamide, N-stearyl erucamide), methylol amides (e.g., methylol stearamide), saturated fatty acid bisamides (e.g., methylene bisstearamide, ethylenebiscapramide, ethylenebislauramide, ethylene bisstearamide, ethylene bishydroxystearamide, ethylene bisbehenamide, hexamethylene bisstearamide, hexamethylene bisbehenamide, hexamethylene hydroxystearamide, N,N'-distearyl adipic acid amide, N,N'-distearyl sebacic acid amide), unsaturated fatty acid bisamides (e.g., ethylene bisoleamide, ethylene biserucamide, hexamethylene bisoleamide, N,N'-dioleoyl adipic acid amide, N,N'-dioleoyl sebacic acid amide), fatty acid ester amides (e.g., stearamidoethyistearanamide), aromatic bisamides (e.g., m-xylylene bis-stearamide, m-xylylene bis-hydroxystearamide, and N,N'-distearylisophthalamide).

As these lubricants, it is particularly preferable to use a fatty acid amide-based lubricant (i.e., saturated fatty acid amide, unsaturated fatty acid amide, substituted amide, methylol amide, saturated fatty acid bisamide, unsaturated fatty acid bisamide, fatty acid ester amide, etc.).

The mass addition rate of the fatty acid amide-based lubricant in the seal layer 7 (hereinafter also referred to as "lubricant addition rate") is preferably in the range of 500 mass ppm to 3,000 mass ppm. The reasons for this are as follows.

When the lubricant addition rate is 500 mass ppm or more, good slipperiness can be assuredly obtained on the inner surface 1*a* of the packaging material 1. When the lubricant addition rate is 3,000 mass ppm or less, the bleed-out amount of the lubricant on an inner surface 1*a* of the packaging material 1 can be assuredly reduced. For this reason, contamination of the tooling and the production line by a white powdery lubricant (hereinafter also referred to as "white powder") deposited on the inner surface 1*a* of the packaging material 1 can be assuredly suppressed.

The particularly preferred lower limit for the lubricant addition rate is 600 mass ppm, and the particularly preferred upper limit is 2,500 mass ppm.

In a case where the heat-fusible resin film is formed of a multilayer film, the lubricant addition rate in the laminate layer 5 is preferably set to 0 to ½ times the lubricant addition rate in the seal layer 7. Furthermore, in a case where the multilayer film includes the intermediate layer 6, the lubricant addition rate in the intermediate layer 6 is preferably set to about two times the lubricant addition rate in the seal layer 7.

Specifically, the lubricant addition rate is preferably set within the following range.

- Lubricant addition rate in the laminate layer 5: 0 mass ppm to 1,500 mass ppm
- Lubricant addition rate in the intermediate layer 6: 1,000 mass ppm to 6,000 mass ppm
- Lubricant addition rate in the seal layer 7: 500 mass ppm to 3,000 mass ppm.

The deposition amount of the lubricant deposited on the inner surface 1*a* of the packaging material 1 (i.e., the surface of the heat-fusible resin layer 4) is not limited but is preferably in the range of 0.1 μg/cm$^2$ to 1 μg/cm$^2$. When the deposition amount of the lubricant is 0.1 μg/cm$^2$ or more, the slipperiness of the inner surface 1*a* of the packaging material 1 can be assuredly and favorably adjusted. When the deposition amount of the lubricant is 1 μg/cm$^2$ or less, contamination of the tooling and the production line by the lubricant can be assuredly suppressed.

The Martens hardness HMs of the heat-fusible resin layer 4 of the packaging material 1 is set in the range of 15 N/mm$^2$ to 25 N/mm$^2$. The reason for this will be described below with reference to FIGS. 6 and 7.

Figure 6:
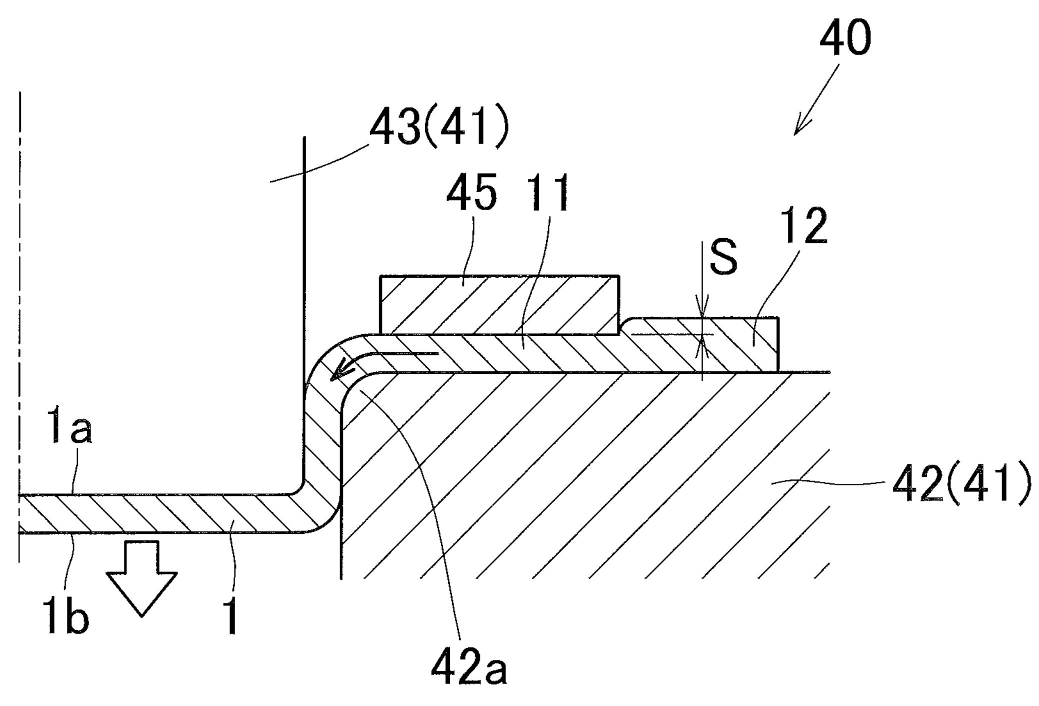
FIG. 6 is a schematic cross-sectional view of a packaging material in the middle of molding in a case where Martens hardness HMs of a heat-fusible resin layer of a packaging material is small.
Figure 7:
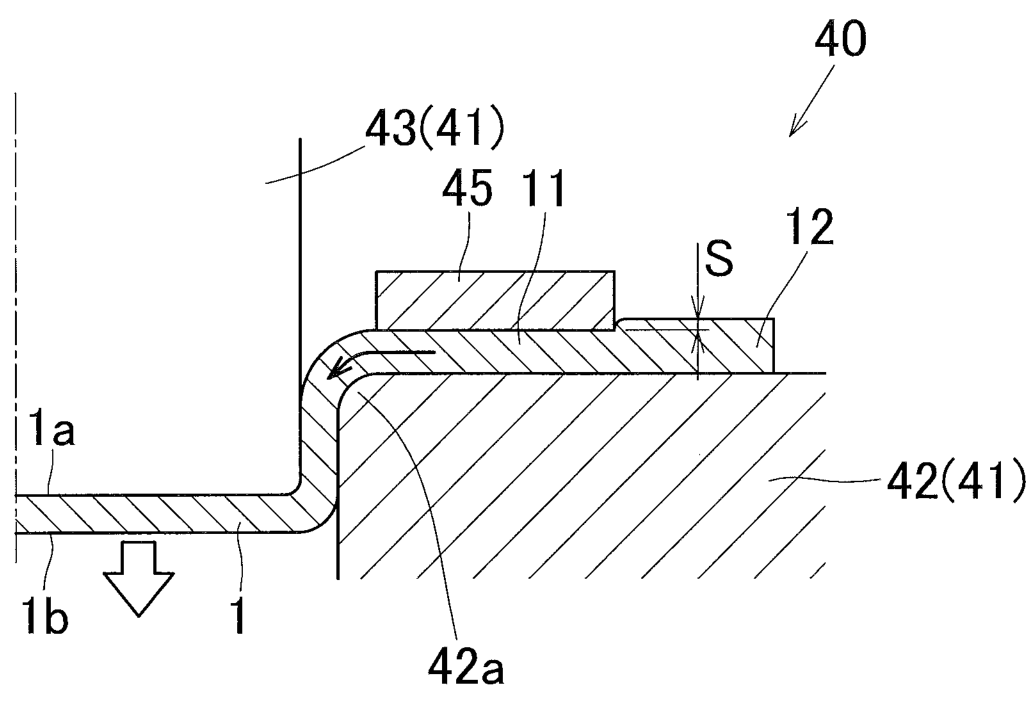
FIG. 7 is a schematic cross-sectional view of the packaging material in the middle of molding in a case where Martens hardness HMs of a heat-fusible resin layer of a packaging material is large.

In FIGS. 6 and 7, the packaging material 1 is arranged with its inner surface 1*a* facing upward on the die 42 of the tooling 41 provided in the drawing device 40. Therefore, the upper surface of the packaging material 1 serves the inner surface 1*a* of the packaging material 1. Furthermore, the outermost peripheral portion of the packaging material 1 is held by the blank holder plate 45 from the upper side so that the outermost periphery of the packaging material 1 protrudes. Therefore, a step S is formed between the upper surface of the portion 11 (this portion is referred to as the "portion-to-be-pressed 11" of the packaging material 1) in the packaging material 1 held by the blank holder plate 45 and the upper surface of the portion 12 (this portion is referred to as the "overhang portion 12" of the packaging material 1) of the packaging material 1 over-hanged toward the outer peripheral portion side of the blank holder 45. In this state, the punch 43 of the tooling 41 is lowered so that the packaging material 1 is pressed and deformed into a container shape in the die 42 by the punch 43. At this time, the portion-to-be-pressed 11 of the packaging material 1 is pulled into the die 42.

In a case where the HMs is small, the step S becomes large as shown in FIG. 6. Therefore, the resistance when the portion-to-be-pressed 11 of the packaging material 1 is pulled into the die 42 is large, and therefore, the molding workability of the packaging material 1 decreases.

In a case where the HMs is large, the step S is small as shown in FIG. 7. Therefore, the resistance when the portion-to-be-pressed 11 of the packaging material 1 is pulled into the die 42 is small. As a result, the portion-to-be-pressed 11 of the packaging material 1 is pulled into the die 42 smoothly at the time of molding the packaging material 1, thereby enabling good molding.

When the HMs is 15 N/mm$^2$ or more, the step S becomes smaller as shown in FIG. 7. Therefore, the packaging material 1 can be favorably molded, i.e., the molding workability of the packaging material 1 is high. The lower limit of the HMs is preferably 16 N/mm$^2$.

When the HMs exceeds 25 N/mm$^2$, the step S becomes even smaller, but the followability of the heat-fusible resin layer 4 to the deformation of the metal foil layer 3 in the packaging material 1 decreases. As a result, the heat-fusible resin layer 4 cannot follow the deformation of the metal foil layer 3 at the corner of the tooling 41 and the shoulder 42*a* of the die 42 where the packaging material 1 undergoes severe molding, and delamination (interlayer delamination) between the metal foil layer 3 and the heat-fusible resin layer 4 and constriction (localized thickness decrease) of the metal foil layer 3 can easily occur. In a case where the HMs is 25 N/mm$^2$ or less, the occurrence of such defects is suppressed, resulting in the packaging material 1 having high molding workability. The upper limit of the HMs is preferably 21 N/mm$^2$.

The HMs varies depending on the conditions of the resin in the heat-fusible resin film (e.g., the type, the melting point, the melt flow rate (MFR), the molecular weight, and additives), the film forming conditions (e.g., the film thickness, the degree of stretching, the extrusion temperature, the winding speed (processing speed), the cooling roll temperature, the air knife air flow, the annealing conditions (temperature and time)), etc. Therefore, the HMs can be set in the range of 15 N/mm$^2$ to 25 N/mm$^2$ by considering these conditions as appropriate.

For example, the HMs can be set in the range of 15 N/mm$^2$ to 25 N/mm$^2$ by adjusting the film-forming conditions under which the heat-fusible resin film can be sufficiently quenched according to the conditions of the resin in the film. Specifically, in the case of forming a heat-fusible resin film high in the HMs, for example, the film's crystalline density is increased by first generating a large number of microcrystals in the film by increasing the film's quenching rate during the formation of the heat-fusible resin film. This makes it possible to form a heat-fusible film with high HMs.

As a method of quenching the film, a method of setting the cooling roll temperature to a temperature lower (by, e.g., 10° C. to 30° C.) than the normal cooling roll temperature (e.g., 40° C.), a method of slowing the film winding speed, and a method of turning on the air knife, can be exemplified. Further, the film may be quenched by combining two or more of these quenching methods. Note that turning the air knife ON means operating the air knife, i.e., setting the air flow rate of the air knife to a predetermined level greater than zero, and turning the air knife OFF means not operating the air knife, i.e., setting the air knife air flow to zero. The same applies hereinafter.

Here, the HMs is the value measured according to ISO 14577 (instrumented indentation test) using a Berkovich indenter as the indenter.

The HMs is also referred to as Martens hardness, which is determined from the slope of the load test force-indentation depth curve (load curve). In the load test force-indentation depth curve when a Berkovich indenter with a dihedral angle of 115° is used and the Berkovich indenter is pressed into the surface of the heat-fusible resin layer 4 of the packaging material 1 to a thickness of 1/10 of the thickness of the heat-fusible resin layer 4, When M is the slope at which the indentation depth from the 50% value (displacement h50 at that time) of the maximum load test force Pmax to the 90% value (displacement h90 at that time) is proportional to the square root of the load test force, the HMs is calculated by the following equation (1).

$$HMs=1/(26.43\times M^2) \quad \text{Formula (1).}$$

The coefficient of dynamic friction of the inner surface 1*a* of the packaging material 1 is preferably in the range of 0.02 to 0.3. The reasons for this are as follows.

When the coefficient of dynamic friction of the inner surface 1*a* of the packaging material 1 is 0.02 or higher, it is possible to assuredly suppress unwinding of the packaging material 1 when the packaging material 1 is coiled into a coil and to assuredly suppress accidental meandering of the packaging material 1 on the conveyor along the production line of the packaging case 20. The more preferred lower limit of the coefficient of dynamic friction is 0.05.

When the coefficient of dynamic friction of the inner surface 1*a* of the packaging material 1 is 0.3 or less, the inner surface 1*a* of the packaging material 1 is high in slipperiness, and therefore, the molding workability of the packaging material 1 is improved. The more preferred upper limit of the coefficient of dynamic friction is 0.25.

Although some embodiments of the present invention have been described above, the present invention is not limited to the above-described embodiments, and various modifications can be made without departing from the scope of the present invention.

For example, in the above-described embodiment, the metal foil layer 3 and the heat-fusible resin layer 4 are bonded to each other via the inner adhesive layer 8*a* in the packaging material 1, but in the present invention, for example, both the layers 3 and 4 may be bonded together without the inner adhesive layer 8*a*.

Furthermore, in the present invention, the main body of the power storage device to be packaged by the packaging material is not limited to a battery main body of various batteries, such as, e.g., a lithium-ion secondary battery, etc., but may also be, for example, a capacitor main body of various capacitors.

EXAMPLES

Specific Examples and Comparative Examples of the present invention are described below. However, it should be noted that the present invention is not limited to the following Examples.

TABLE 1

| | Heat-fusible resin film | | | | | | | | | | | |
|---|---|---|---|---|---|---|---|---|---|---|---|---|
| | | | Seal layer | | | | | | | | | |
| | | | Resin | | AB material | | | Roughening material | | | Lubricant | |
| | Type | Thickness (μm) | Type | Thickness (μm) | Type | Average particle diameter (μm) | Addition rate (ppm) | Type | Average particle diameter (μm) | Addition rate (ppm) | Type | Addition rate (ppm) |
| Ex. 1 | Three layers | 80 | rPP | 12 | Silica | 1 | 1,000 | HDPE beads | 8 | 4,000 | Erucamide | 2,000 |
| Ex. 2 | Three layers | 80 | rPP + hPP | 12 | Ca carbonate | 2 | 2,000 | HDPE beads | 8 | 3,000 | Erucamide | 1,800 |
| Ex. 3 | Three layers | 40 | hPP | 6 | Silica | 1 | 1,000 | HDPE beads | 10 | 5,000 | Erucamide | 2,600 |
| Ex. 4 | Three layers | 80 | rPP | 12 | Silica | 1 | 3,000 | — | — | — | Erucamide | 1,800 |
| Ex. 5 | Three layers | 80 | rPP | 12 | Ca carbonate | 2 | 2,000 | HDPE beads | 8 | 3,000 | Erucamide | 1,800 |

TABLE 1-continued

| | Heat-fusible resin film | | | | | | | | | | | |
|---|---|---|---|---|---|---|---|---|---|---|---|---|
| | | | Seal layer | | | | | | | | | |
| | | | Resin | | AB material | | | Roughening material | | | Lubricant | |
| | Type | Thickness (μm) | Type | Thickness (μm) | Type | Average particle diameter (μm) | Addition rate (ppm) | Type | Average particle diameter (μm) | Addition rate (ppm) | Type | Addition rate (ppm) |
| Ex. 6 | Three layers | 40 | rPP + hPP | 6 | Silica | 1 | 2,000 | HDPE beads | 10 | 2,500 | Erucamide | 2,500 |
| Ex. 7 | Single layer | 30 | hPP | 30 | Alumina | 4 | 3,500 | Acrylic resin beads | 6 | 4,000 | Erucamide | 600 |
| Comp. Ex. 1 | Three layers | 80 | rPP + hPP | 12 | Silica | 1 | 2,000 | HDPE beads | 8 | 2,000 | Erucamide | 3,500 |
| Comp. Ex. 2 | Three layers | 80 | rPP | 12 | Silica | 1 | 3,500 | — | — | — | Erucamide | 1,400 |
| Comp. Ex. 3 | Single layer | 30 | hPP | 30 | Ca carbonate | 2 | 2,000 | Acrylic resin beads | 6 | 4,000 | Erucamide | 2,800 |
| Comp. Ex. 4 | Single layer | 25 | rPP | 25 | Silica | 1 | 1,500 | HDPE beads | 8 | 3,000 | Erucamide | 400 |

TABLE 2

| | Heat-fusible resin film | | | | | | | | | | | | | |
|---|---|---|---|---|---|---|---|---|---|---|---|---|---|---|
| | Intermediate layer | | | | | Laminate layer | | | | | | | | |
| | Resin | | AB material/ roughening material | Lubricant | | Resin | | AB material | | | Roughening material | Lubricant | | Total lubricant |
| | Type | Thickness (μm) | Addition rate | Type | Addition rate (ppm) | Type | Thickness (μm) | Type | Average particle diameter (μm) | Addition rate (ppm) | Addition rate (ppm) | Type | Addition rate (ppm) | content (ppm) |
| Ex. 1 | bPP | 56 | No additive | Erucamide | 5,100 | rPP | 12 | Silica | 1 | 2,500 | No additives | Erucamide | 800 | 3,990 |
| Ex. 2 | bPP | 56 | No additive | Erucamide | 4,800 | rPP + hPP | 12 | — | — | — | No additives | Erucamide | 1,600 | 3,870 |
| Ex. 3 | bPP | 28 | No additives | Erucamide | 5,100 | rPP | 6 | Silica | 1 | 2,500 | No additives | Erucamide | 800 | 4,080 |
| Ex. 4 | bPP | 56 | No additive | Erucamide | 4,800 | rPP + hPP | 12 | — | — | — | No additives | Erucamide | 1,600 | 3,870 |
| Ex. 5 | bPP | 56 | No additive | Erucamide | 5,100 | rPP | 12 | Silica | 1 | 2,500 | No additives | Erucamide | 800 | 3,960 |
| Ex. 6 | bPP | 28 | No additive | Erucamide | 4,800 | rPP + hPP | 6 | — | — | — | No additives | Erucamide | 1,600 | 3,975 |
| Ex. 7 | — | — | — | — | — | — | — | — | — | — | — | — | — | 600 |
| Comp. Ex. 1 | bPP | 56 | No additive | Erucamide | 4,800 | rPP + hPP | 12 | — | — | — | No additives | Erucamide | 1,600 | 4,125 |
| Comp. Ex. 2 | bPP | 56 | No additive | Erucamide | 5,100 | rPP | 12 | Silica | 1 | 2,500 | No additives | Erucamide | 800 | 3,900 |
| Comp. Ex. 3 | — | — | — | — | — | — | — | — | — | — | — | — | — | 2,800 |
| Comp. Ex. 4 | — | — | — | — | — | — | — | — | — | — | — | — | — | 400 |

TABLE 3

| | Heat-fusible resin film Film forming condition | | |
|---|---|---|---|
| | Winding rate (m/min) | Air knife | Cooling roll temp. (° C.) |
| Ex. 1 | 1 | ON | 20 |
| Ex. 2 | 1 | OFF | 20 |
| Ex. 3 | 4 | ON | 20 |

TABLE 3-continued

| | Heat-fusible resin film Film forming condition | | |
|---|---|---|---|
| | Winding rate (m/min) | Air knife | Cooling roll temp. (° C.) |
| Ex. 4 | 4 | ON | 30 |
| Ex. 5 | 1 | OFF | 10 |
| Ex. 6 | 1 | ON | 20 |

TABLE 3-continued

| | Heat-fusible resin film Film forming condition | | |
|---|---|---|---|
| | Winding rate (m/min) | Air knife | Cooling roll temp. (° C.) |
| Ex. 7 | 4 | ON | 10 |
| Comp. Ex. 1 | 4 | ON | 40 |
| Comp. Ex. 2 | 4 | OFF | 40 |
| Comp. Ex. 3 | 1 | ON | 20 |
| Comp. Ex. 4 | 4 | OFF | 20 |

TABLE 4

| | HMs ($N/mm^2$) | Coefficient of dynamic friction | Molding workability | White powder wipe test |
|---|---|---|---|---|
| Ex. 1 | 18.10 | 0.06 | ◎ | ○ |
| Ex. 2 | 16.90 | 0.12 | ◎ | ○ |
| Ex. 3 | 16.06 | 0.15 | ◎ | Δ |
| Ex. 4 | 15.32 | 0.04 | ○ | ○ |
| Ex. 5 | 20.22 | 0.25 | ◎ | ○ |
| Ex. 6 | 22.01 | 0.30 | ○ | ○ |
| Ex. 7 | 19.19 | 0.18 | ◎ | ○ |
| Comp. Ex. 1 | 14.86 | 0.10 | X | X |
| Comp. Ex. 2 | 13.90 | 0.29 | X | ○ |
| Comp. Ex. 3 | 26.10 | 0.11 | X | X |
| Comp. Ex. 4 | 13.50 | 0.32 | X | ○ |

1. Production of Polyolefin-Based Film

As a polyolefin-based film (hereinafter also referred to as "heat-fusible resin film") constituting the heat-fusible resin layer 4 of the packaging material 1, a single-layer CPP film and a three-layer co-extruded CPP film were produced by the following methods.

(1) Single-Layer CPP Film

In Example 7 and Comparative Examples 3 and 4, single-layer CPP films of 25 μm and 30 μm thickness with different Martens hardness HMs were produced by adding predetermined amounts of an AB material, a roughening material, and a lubricant to the hPP or the rPP and adjusting the film forming conditions (winding speed, air knife on/off, and cooling roll temperature).

In this CPP film, silica particles, Ca carbonate (calcium carbonate) particles or alumina particles were used as the AB material, HDPE (high-density polyethylene) beads or acrylic resin beads were used as the roughening material, and erucamide was used as the lubricant. The details are shown in Tables 1 and 2.

In Tables 1 and 2, the addition rate of the AB material, the addition rate of the roughening material, and the addition rate of the lubricant all refers to the mass addition rate (mass content rate). The same applies hereinafter.

Furthermore, the film forming conditions (winding speed, air knife ON/OFF, and cooling roll temperature) when this CPP film was produced are shown in Table 3.

(2) Three-Layer Co-Extruded CPP Film

In Examples 1 to 6 and Comparative Examples 1 and 2, bPP was used as the intermediate layer 6, rPP or and/or hPP was used as the seal layer 7 and laminate layer 5, a predetermined amount of an AB material, a roughening material, and/or a lubricant was added to each layer, and the film forming conditions (winding speed, air knife ON/OFF, and cooling roll temperature) was adjusted. Thus, three-layer co-extruded CPP film of 40 μm and 80 μm thickness with different Martens hardness HMs were produced.

In this CPP film, silica or calcium carbonate (Ca carbonate) particles were used as the AB material, HDPE beads were used as the roughening material, and erucamide was used as the lubricant. The details are shown in Tables 1 and 2.

Furthermore, the film forming conditions (winding speed, air knife ON/OFF, and cooling roll temperature) for producing this CPP film are shown in Table 3.

2. Production of Packaging Material

A chemical conversion coating (thickness: 0.05 μm) was formed on each of the inner and outer surfaces of a 40 μm thick aluminum foil (metal foil layer 3) (material: A8021-0) as the underlying layer 3*a*. The chemical conversion coatings were formed by coating both surfaces of the aluminum foil with a chemical conversion coating solution composed of phosphoric acid, polyacrylic acid (acryl-based resin), a chromium (III) salt compound, water, and alcohol, and then drying the solution at 180° C. The chromium adhesion amount on the chemical conversion coat was 5 $mg/m^2$ on one surface of the aluminum foil.

Next, a 25 μm thick biaxially stretched 6-nylon (ONy) film as the substrate layer 2 was dry-laminated (bonded) to one surface (outer surface) of the above-described chemical conversion treated aluminum foil via a two-part curing type urethane-based adhesive layer (thickness: 3 μm) as the outer adhesive layer 8*b*.

Next, the other surface (inner surface side) of the aluminum foil after dry lamination described above was overlaid on the outer surface of the single-layer CPP film described above or the outer surface of the laminate layer 5 of the three-layer co-extruded CPP film described above via a two-part curing type adhesive layer (thickness: 2 μm) as the inner adhesive layer 8*a*, and the two-layer adhesive layer was placed between a rubber nip roll and a laminating roll heated to 100° C. and dry laminated, and thereafter aged at 40° C. for 7 to 10 days to thereby produce a packaging material 1 for evaluation.

Note that the outer surface of the above-described single-layer CPP film and the outer surface of the laminate layer 5 of the above-described three-layer co-extruded CPP film were subjected to a corona treatment before the other surface (inner surface) of the aluminum foil after the above-described dry lamination was superimposed on the outer surface. Furthermore, a two-part curing type adhesive composed of a maleic acid-modified polypropylene resin and isocyanate was used as the adhesive for the two-part curing type adhesive layer as the inner adhesive layer 8*a*.

3. Evaluation

The Martens hardness HMs, the coefficient of dynamic friction, the molding workability test, and the white powder wiping test of the heat-fusible resin layer 4 were performed on the above-described packaging material 1 for evaluation. The results are shown in Table 4.

The methods of measuring the HMs and the coefficient of dynamic friction, as well as the molding workability test and the white powder wipe test were as follows.

<Martens Hardness HMs>

One drop of instant adhesive "Aron Alpha (registered trademark)" manufactured by Toagosei Co., Ltd. was applied on a glass slide, and through this instant adhesive, the outer surface 1*b* of the sample piece taken from the packaging material 1 for evaluation, that is, the surface of the substrate layer 2, was bonded and fixed to the glass slide. The inner surface 1*a* of the sample piece, i.e., the surface of the heat-fusible resin layer 4 (seal layer 7), was then used as a measurement surface, and the HMs was measured using a Berkovich indenter in accordance with ISO 14577. This measurement was performed at least five times, and the arithmetic mean of the measurements was taken as the value of the HMs.

The device and software used for this measurement are as follows, and HMs was calculated using this software.

Measuring device: Dynamic Ultra Micro Hardness Tester DUH-211 (Shimadzu Corporation)

Software: SHIMAZU DUH Application Version 2.20.

Furthermore, the measurement conditions were as follows.

Berkovich indenter: Triangular pyramid diamond indenter with a dihedral angle of 115.0°

Measuring temperature: 23° C.

Relative humidity: 60% RH

Loading speed: 2.6648 mN/s

Maximum indentation depth: 10% of the thickness of the heat-fusible resin layer 4 (e.g., in the case of a heat-fusible resin film (heat-fusible resin layer 4) with a thickness of 80 μm, the maximum indentation depth was 8 μm).

Here, since the maximum pressing depth into the surface of the heat-fusible resin layer 4 by the Berkovitz indenter is 10% of the thickness of the heat-fusible resin layer 4, the HMs obtained in this measurement is, in detail, the value of the surface layer from its surface to 10% of its thickness (depth) in the heat-fusible resin layer 4.

<Coefficient of Dynamic Friction>

The coefficient of dynamic friction was measured on an inner surface 1*a* of a sample piece taken from the packaging material 1 for evaluation, i.e., the surface of the heat-fusible resin layer 4 (seal layer 7) in accordance with JIS K7125: 1999 using a friction measuring instrument Model TR manufactured by Toyo Seiki Mfg. This measurement was performed at least three times, and the arithmetic mean of the measured values was used as the value of coefficient of dynamic friction.

<Molding Workability Test>

Using a press molding machine (part number: TP-25C-X2) manufactured by Amada Co., Ltd., the sample plate taken from the packaging material 1 for evaluation was deep-drawn molded into a rectangular container 55 mm long×35 mm wide×4 mm to 8 mm deep at a molding speed of 20 spm using a drawing processing machine. Then, the presence or absence of pinholes in the corners of the obtained deep-drawn molded product was visually confirmed by transmitted light, the maximum molding depth at which pinholes did not occur was examined, and the moldability of the packaging material was evaluated. Note that ◎ and ○ are defined as acceptable for the molding workability test.

◎: The maximum forming depth is 7 mm or more.

○: The maximum forming depth is 5 mm or more but less than 7 mm.

X: The maximum forming depth is less than 5 mm.

<White Powder Wipe Test>

The entire inner surface 1*a* of a rectangular sample piece of 200 mm long×100 mm wide taken from the packaging material 1 for evaluation, that is, the entire surface of the heat-fusible resin layer 4 (seal layer 7), was wiped with a black cloth, and the adhesion of white powder on the black cloth after wiping was evaluated visually. The evaluation criteria are as follows. Note that ○ and Δ are defined as acceptable for the white powder wipe test.

○: Almost no adhesion of white powder

Δ: Slight adhesion of white powder observed

X: A large amount of white powder adhered

As can be seen from the "Molding Workability" column in Table 4, the molding workability was good in the case of Examples 1 to 7. Therefore, it could be confirmed that the packaging material has high molding workability in a case where the HMs of the heat-fusible resin layer of the packaging material (in detail, the surface portion from its surface to 10% of its thickness in the heat-fusible resin layer of the packaging material) is in the range of 15 N/mm$^2$ to 25 N/mm$^2$.

This application claims priority to Japanese patent application No. 2022-93211 filed on Jun. 8, 2022, and Japanese patent application No. 2023-76574 filed on May 8, 2023, the disclosure of which is incorporated herein by reference in its entirety.

It should be recognized that the terms and expressions used herein are for illustrative purposes only, are not to be construed as limiting, do not exclude any equivalents of the features shown and described herein, and allow for various variations within the claimed scope of this invention. and that various variations within the claimed scope of this invention are allowed.

INDUSTRIAL APPLICABILITY

The present invention can be used for a packaging material for a power storage device, such as, e.g., a battery (e.g., lithium-ion secondary battery, all solid-state battery), a capacitor (e.g., electric double layer capacitor, lithium-ion capacitor), and the like.

DESCRIPTION OF REFERENCE SYMBOLS

1: Packaging material

1*a*: Inner surface of packaging material

2: Substrate layer

3: Metal foil layer

4: Heat-fusible resin layer

20: Packaging case

21: Packaging case main body (molded article)

30: Battery (power storage device)

31 Battery main body (power storage device main body)

The invention claimed is:

1. A packaging material for a power storage device comprising:

a laminated material, wherein the laminated material is provided with a metal foil layer, a substrate layer provided on an outer surface side of the metal foil layer, and a heat-fusible resin layer provided on an inner surface side of the metal foil layer in a laminated state, wherein the heat-fusible resin layer is arranged on an inner surface side of the laminate material, wherein the heat-fusible resin layer is formed of a polyolefin-based layer, and wherein Martens hardness HMs of the heat-fusible resin layer measured with a Berkovich indenter is in a range of 15 N/mm$^2$ to 22.01 N/mm$^2$.

2. The packaging material for a power storage device as recited in claim 1, wherein a coefficient of dynamic friction of an inner surface of the packaging material is in a range of 0.02 to 0.3.

3. The packaging material for a power storage device as recited in claim 1, wherein the polyolefin-based layer is formed of at least one layer of film, and wherein in the at least one layer of film, a film forming the inner surface of the packaging material contains 500 mass ppm to 3,000 mass ppm of a fatty acid amide-based lubricant.

4. A packaging case for a power storage device, the packaging case being provided with a deep-drawn molded article or a stretch-molded article of the packaging material as recited in claim 1 as a packaging case constituent member.

5. A power storage device in which a power storage device main body is accommodated in a packaging case equipped with a deep-drawn molded article or a stretch-molded article of the packaging material as recited in claim 1 as a packaging case constituent member.

6. The packaging material for a power storage device as recited in claim 1, wherein Martens hardness HMs of the heat-fusible resin layer measured with a Berkovich indenter is in a range of 15 $N/mm^2$ to 21 $N/mm^2$.

7. The packaging material for a power storage device as recited in claim 1, wherein the heat-fusible resin layer has a heat-fusible resin film that has produced according to a film forming conditions including a cooling roll temperature of 10° C. to 30° C.

8. The packaging material for a power storage device as recited in claim 1, wherein the heat-fusible resin layer has a heat-fusible resin film that has produced according to a film forming conditions including a winding speed of 1 m/min to 4 m/min.

* * * * *